Patented Aug. 27, 1929.

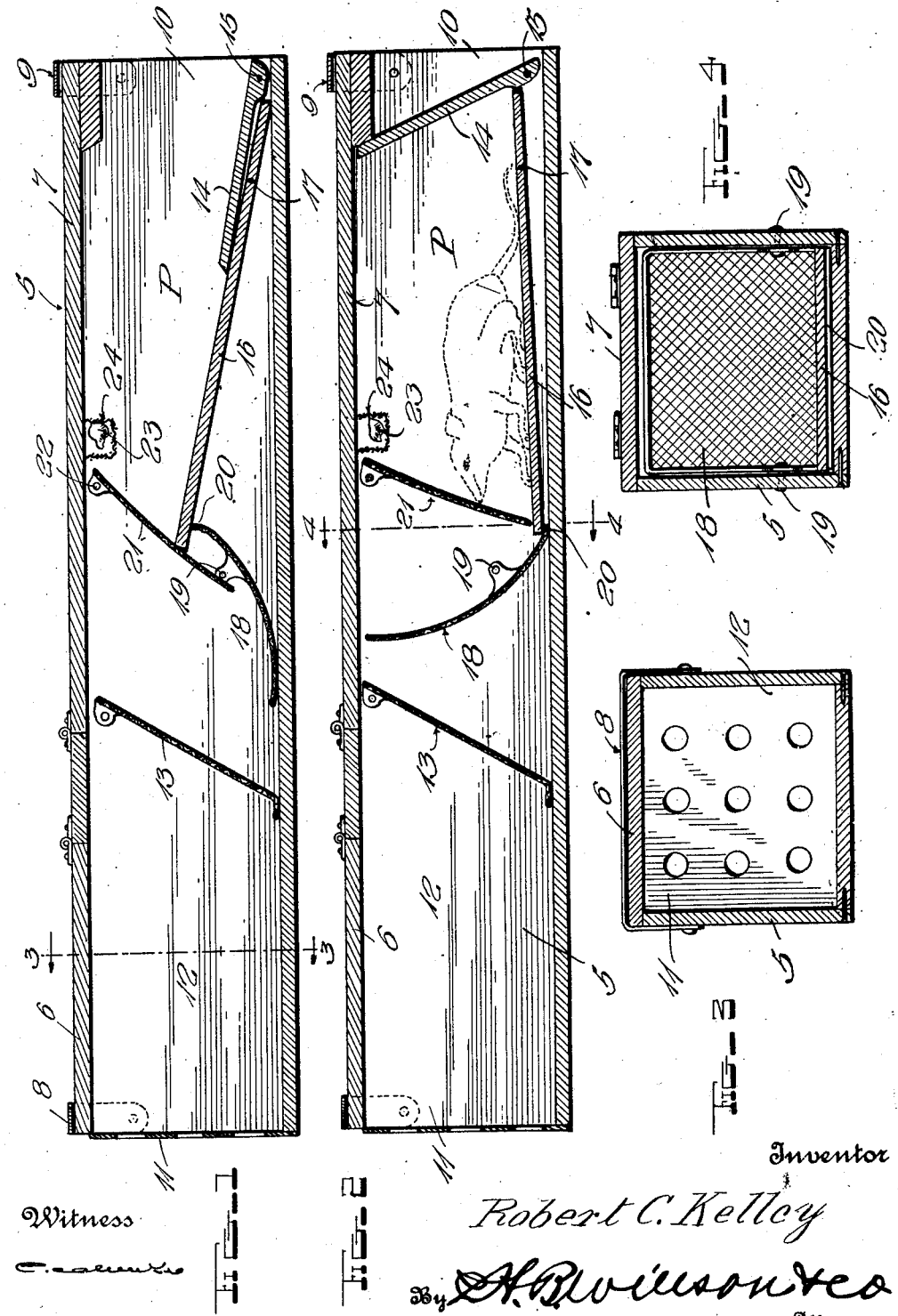

1,726,493

UNITED STATES PATENT OFFICE.

ROBERT CARTER KELLEY, OF CHAUTAUQUA, KANSAS.

ANIMAL TRAP.

Application filed April 23, 1928. Serial No. 272,324.

The invention relates to animal traps of the general type which is automatically reset by passage of an entrapped animal from the entrance portion of the trap into a cage or the like, and it is the object of the invention to provide a simple and inexpensive, yet an efficient and reliable trap of this nature, in which novel provision is made to insure that a depressible platform which operates certain doors, shall be held in door-closed position, until the ingoing animal reaches a point at which there is no danger of escape.

With the foregoing in view, the invention resides in the novel subject matter hereinafter described and claimed, description being accomplished by reference to the accompanying drawing.

Fig. 1 is a longitudinal sectional view showing the normal positions of parts.

Fig. 2 is a view similar to Fig. 1 but illustrating the relation of parts when an animal enters the trap.

Figs. 3 and 4 are transverse sectional views on the correspondingly numbered lines of Figs. 1 and 2 respectively.

In its preferred construction, the main body 5 of the trap is in the form of a horizontally elongated box whose top is formed primarily of two hinged doors 6—7, held normally closed by appropriate pivoted yokes or the like 8—9. The front end 10 of the box 5 is open while its rear end is closed by a perforated plate 11 or other desired means. This end portion of the box constitutes a cage 12 to receive the entrapped animals, and said cage is provided with a one-way door 13. The portion of the box between the door 13 and the inlet or front end 10, constitutes a passage leading to the cage 12, and novel provision is made within this passage to prevent the escape of an animal after he once enters. The door 6 opens into the cage 12 and door 5 into the passage leading to said cage. For future reference, this passage is identified in the drawing by the letter P.

A normally lowered, upwardly swingable front door 14 is provided for the passage P, being pivoted at 15 in said passage, upon a transverse axis. Extending longitudinally in the passage P and inclining rearwardly, is a platform 16 whose front portion underlies the door 14, in rear of the pivot 15. This platform is pivoted between its ends at 17 so that upon depression of its rear end, its front end will be elevated as in Fig. 2, thus closing the door 14.

A second, normally lowered, upwardly swingable door 18 is normally declined as shown in Fig. 1 and is pivoted between its front and rear ends at 19. The front end 20 of this door supports the rear end of the platform 16 and hence, when this platform is depressed as in Fig. 2, it effects upward swinging of the door 18, as well as the door 14.

A third, rearwardly declined door 21 is loosely suspended at 22, the suspending means or pivot being above the rear end portion of the platform 16. This door 21 normally lies against the rear end of the platform as seen in Fig. 1, but when said platform is depressed as shown in Fig. 2, door 21 swings downwardly and forwardly toward a vertical position, at which it overlies the front end of said platform. Thus, this platform is temporarily locked against movement, and if the entrapped animal moves back toward the door 14, he cannot by any possibility so move the platform as to effect opening of this door. Hence, he will in time force rearwardly upon the door 21 and as it yields rearwardly and upwardly, he will follow and will force rearwardly and downwardly upon the door 18 which then stands raised as in Fig. 2. His weight of course swings door 18 to the normal position of Fig. 1, and as this takes place, platform 16 and door 14 are restored to their normal positions. Just as soon as the animal passes the door 21, this door again falls to the position of Fig. 1, preventing the animal from again moving onto the platform 16 and forcing him to enter the cage 12 by upwardly swinging the door 13, if he is to proceed at all.

The door 6 may be opened whenever it is desired to remove a trapped animal or animals, and the door 7 may be opened to gain access to any internal parts whenever necessary, and to place bait 23 in a bait basket 24.

Excellent results are obtainable from the general construction shown and described, and it is therefore preferably followed. However, within the scope of the invention as claimed, variations may be made, and obviously the trap may be constructed of any desired size and of any appropriate materials, according to the kind of animals to be caught.

I claim:—

In a trap, an entrance passage having a one-way door at its rear end, a normally-lowered upwardly-swingable front door for said passage, a rearwardly inclined platform in said passage having its front end underlying said front door in rear of the pivot of this door, said platform being pivoted between its ends, a second normally-lowered upwardly-swingable door pivoted between its ends on an axis in rear of said platform, said second normally lowered door being rearwardly declined and at its front end supporting the rear end of said platform, whereby depression of said platform will effect closing of both of said normally-lowered doors, and a third rearwardly-declined door loosely suspended in said passage and normally lying against the rear end of said platform, said third rearwardly declined door being adapted upon depression of the platform to swing toward a vertical position and rest upon the upper side of said platform, locking the latter until the entrapped animal rearwardly swings said third rearwardly inclined door.

In testimony whereof I have hereunto affixed my signature.

ROBERT CARTER KELLEY.